Figure 1:
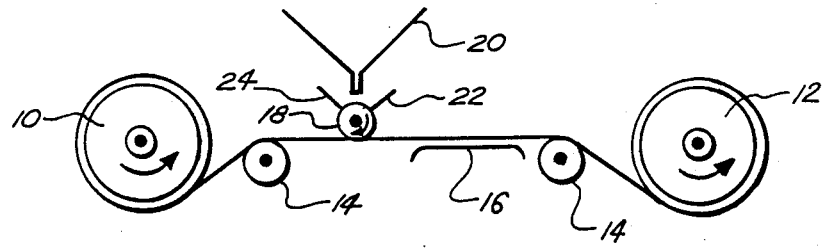

United States Patent [19]

Wright

[11] Patent Number: 4,892,896

[45] Date of Patent: Jan. 9, 1990

[54] PROCESSING POLYIMIDE PRECURSOR COMPOSITIONS

[75] Inventor: William E. Wright, Baton Rouge, La.

[73] Assignee: Ethyl Corporation, Richmond, Va.

[21] Appl. No.: 179,398

[22] Filed: Apr. 4, 1988

[51] Int. Cl.$^4$ ............................................... C08J 3/28
[52] U.S. Cl. ..................................... 523/300; 524/104
[58] Field of Search ............... 523/300; 528/353, 322; 524/104; 524/104

[56] References Cited

U.S. PATENT DOCUMENTS

| | | |
|---|---|---|
| Re. 30,213 | 2/1980 | Gagliani . |
| Re. 32,255 | 9/1986 | Gagliani et al. ................ 521/56 |
| Re. 32,256 | 9/1986 | Gagliani ........................ 521/180 |
| 3,356,648 | 12/1967 | Rogers . |
| 3,506,583 | 4/1970 | Boram et al. ................ 252/188.3 |
| 3,511,807 | 5/1970 | Lovejoy ........................ 528/353 |
| 3,542,735 | 11/1970 | Lynch . |
| 3,573,132 | 3/1971 | Ducloux et al. .............. 156/306 |
| 3,699,075 | 10/1972 | Lubowitz . |
| 3,700,649 | 10/1972 | Boram et al. . |
| 3,726,831 | 4/1973 | Acle ............................. 252/188.3 |
| 3,726,834 | 4/1973 | Acle ............................. 252/188.3 |
| 3,745,149 | 7/1973 | Serafini et al. . |
| 3,748,311 | 7/1973 | Burns et al. . |
| 3,761,453 | 9/1973 | Jones . |
| 3,772,254 | 11/1973 | Jones et al. . |
| 3,792,022 | 2/1974 | Jones . |
| 3,793,281 | 2/1974 | Acle . |
| 3,812,159 | 5/1974 | Lubowitz . |
| 3,926,913 | 12/1975 | Jones et al. . |
| 3,951,902 | 4/1976 | Jones et al. . |
| 3,959,350 | 5/1976 | Rogers . |
| 3,965,125 | 6/1976 | Meyers . |
| 3,975,363 | 8/1976 | Jones . |
| 3,988,303 | 10/1976 | Korshak et al. . |
| 4,070,312 | 1/1978 | Gagliani et al. . |
| 4,100,138 | 7/1978 | Bilow et al. .................. 526/262 |
| 4,111,906 | 9/1978 | Jones et al. .................. 528/170 |
| 4,116,937 | 9/1978 | Jones et al. . |
| 4,153,783 | 5/1979 | Gagliani ...................... 528/337 |
| 4,173,700 | 11/1979 | Green et al. ................. 528/125 |
| 4,196,277 | 4/1980 | Jones et al. ................. 528/208 |
| 4,203,922 | 5/1980 | Jones et al. . |
| 4,234,648 | 11/1980 | Patz et al. ................... 428/245 |
| 4,237,262 | 12/1980 | Jones ........................... 528/322 |
| 4,241,114 | 12/1980 | Gagliani ...................... 427/370 |
| 4,241,193 | 12/1980 | Gagliani ........................ 521/77 |
| 4,244,853 | 1/1981 | Serafini et al. ............... 528/353 |
| 4,255,488 | 3/1981 | Gagliani ...................... 428/398 |
| 4,269,968 | 5/1981 | Duran et al. ................. 528/351 |
| 4,273,886 | 6/1981 | Gagliani ...................... 521/185 |
| 4,273,916 | 6/1981 | Jones ........................... 528/117 |
| 4,283,521 | 8/1981 | Jones ........................... 528/117 |
| 4,296,208 | 10/1981 | Gagliani et al. ................ 521/77 |
| 4,299,787 | 11/1981 | Gagliani ........................ 264/41 |
| 4,305,796 | 12/1981 | Gagliani et al. ............. 204/159.19 |
| 4,315,076 | 2/1982 | Gagliani et al. ................ 521/77 |
| 4,315,077 | 2/1982 | Gagliani et al. ................ 521/77 |
| 4,315,080 | 2/1982 | Gagliani et al. .............. 521/189 |
| 4,319,000 | 3/1982 | Gagliani et al. .............. 521/189 |
| 4,329,387 | 5/1982 | Goodrich et al. ............. 428/196 |

(List continued on next page.)

Primary Examiner—Lewis T. Jacobs
Attorney, Agent, or Firm—John F. Sieberth; Richard J. Hammond

[57] ABSTRACT

Prepreg precursors and other normally non-flowable resinous semi-solid or viscous liquid polyimide precursor compositions often need to be transformed into free-flowable liquids without dilution and without causing changes in their chemical composition. Such compositions are composed of (a) a diester of an aromatic tetracarboxylic acid, (b) an aromatic diamine, (c) a polyamic acid producible from (i) an aromatic diamine and (ii) a dianhydride of an aromatic tetracarboxylic acid, and (d) an inert solvent in an amount insufficient to provide a flowable liquid at room temperature. Such compositions readily undergo chemical change (amidization and imidization) when subjected to heating in a conventional oven because of local overheating, and poor heat transfer within the body of the composition. These problems are overcome by subjecting the composition to microwave radiation of intensity sufficient to convert at least a portion of the composition into a flowable liquid without causing a significant change in its chemical composition.

20 Claims, 1 Drawing Sheet

U.S. PATENT DOCUMENTS

| | | | |
|---|---|---|---|
| 4,332,656 | 6/1982 | Gagliani et al. | 204/159.14 |
| 4,346,182 | 8/1982 | Gagliani et al. | 521/189 |
| 4,350,741 | 9/1982 | Hasegawa et al. | 428/698 |
| 4,353,998 | 10/1982 | Gagliani et al. | 523/219 |
| 4,355,120 | 10/1982 | Gagliani et al. | 521/189 |
| 4,360,604 | 11/1982 | Gagliani et al. | 521/189 |
| 4,361,453 | 11/1982 | Gagliani et al. | 156/79 |
| 4,363,690 | 12/1982 | Gagliani et al. | 156/79 |
| 4,363,883 | 12/1982 | Gagliani et al. | 521/122 |
| 4,367,296 | 1/1983 | Gagliani et al. | 521/189 |
| 4,369,261 | 1/1983 | Gagliani et al. | 521/189 |
| 4,407,980 | 10/1983 | Gagliani et al. | 521/99 |
| 4,425,441 | 1/1984 | Gagliani et al. | 521/56 |
| 4,426,463 | 1/1984 | Gagliani et al. | 521/180 |
| 4,433,068 | 2/1984 | Long et al. | 521/88 |
| 4,439,381 | 3/1984 | Gagliani et al. | 264/54 |
| 4,440,643 | 4/1984 | Makino et al. | 528/353 |
| 4,442,283 | 4/1984 | Gagliani et al. | 528/323 |
| 4,444,823 | 4/1984 | Gagliani et al. | 428/113 |
| 4,468,431 | 8/1984 | Okey | 428/317.7 |
| 4,470,944 | 9/1984 | Asakura et al. | 264/203 |
| 4,476,254 | 10/1984 | Long et al. | 524/180 |
| 4,477,648 | 10/1984 | Jones et al. | 528/185 |
| 4,506,038 | 3/1985 | Gagliani et al. | 521/90 |
| 4,518,717 | 5/1985 | Long et al. | 521/113 |
| 4,521,623 | 6/1985 | Jones et al. | 564/430 |
| 4,522,880 | 6/1985 | Klostermeier et al. | 428/332 |
| 4,528,004 | 7/1985 | Makino et al. | 55/158 |
| 4,528,216 | 7/1985 | Ogura et al. | 427/387 |
| 4,532,275 | 7/1985 | Aito et al. | 523/468 |
| 4,533,574 | 12/1985 | Fryd et al. | 427/82 |
| 4,535,099 | 8/1985 | Lee et al. | 521/154 |
| 4,535,101 | 8/1985 | Lee et al. | 521/189 |
| 4,539,336 | 9/1985 | Long et al. | 521/77 |
| 4,539,342 | 9/1985 | Lee et al. | 521/180 |
| 4,543,295 | 9/1985 | St. Clair et al. | 428/458 |
| 4,546,115 | 10/1985 | Gagliani et al. | 521/184 |
| 4,556,682 | 12/1985 | Gagliani et al. | 521/185 |
| 4,562,100 | 12/1985 | Fryd et al. | 427/82 |
| 4,562,112 | 12/1985 | Lee et al. | 264/321 |
| 4,576,862 | 3/1986 | Lee et al. | 156/196 |
| 4,581,263 | 4/1986 | Lukas | 428/36 |
| 4,585,805 | 4/1986 | Gagliani et al. | 521/129 |
| 4,595,548 | 6/1986 | St. Clair et al. | 264/236 |
| 4,599,365 | 7/1986 | Gagliani et al. | 521/56 |
| 4,600,770 | 7/1986 | Gagliani et al. | 528/322 |
| 4,603,061 | 7/1986 | St. Clair et al. | 427/162 |
| 4,604,409 | 8/1986 | Gagliani et al. | 521/157 |
| 4,612,210 | 9/1986 | Hofer et al. | 427/82 |
| 4,621,015 | 11/1986 | Long et al. | 521/185 |
| 4,639,343 | 1/1987 | Long et al. | 264/45.5 |
| 4,648,010 | 4/1987 | Long et al. | 528/322 |
| 4,690,999 | 9/1987 | Numata et al. | 528/188 |
| 4,708,972 | 11/1987 | Long et al. | 521/185 |

FOREIGN PATENT DOCUMENTS

| | | |
|---|---|---|
| 0092846 | 11/1983 | European Pat. Off. |
| 0134973 | 3/1985 | European Pat. Off. |
| 0142149 | 5/1985 | European Pat. Off. |
| 0150931 | 8/1985 | European Pat. Off. |
| 58-91430 | 5/1983 | Japan . |
| 58-180530 | 10/1983 | Japan . |
| 58-180531 | 10/1983 | Japan . |
| WO84/04102 | 11/1985 | World Int. Prop. O. |

OTHER PUBLICATIONS

Published Patent Application NASA Case No. LE-W-12,876-2 (S.N. 393,583, filed Jun. 30, 1982) No. N83-29392.

Chamis et al., NASA Technical Memorandum NASA TM X 67802 (Apr. 20–22, 1971).

Serafini et al., NASA Technical Memorandum NASA TM X-67803 (Apr. 6–7, 1971).

Serafini et al., Journal of Applied Polymer Science, vol. 16, pp. 905–915 (1972).

Serafini et al., NASA Technical Note NASA TN D-6611, Jan. 1972.

Serafini et al., Applied Polymer Symposium No. 22, pp. 89–100 (1973).

Serafini et al. NASA Technical Memorandum 79039, (Apr. 1–6, 1979).

Serafini et al., NASA Technical Memorandum NASA TM X-71894 (Apr. 6–8, 1976).

Delvigs, et al., NASA Technical Memorandum 79062 (May 8–10, 1979).

Delvigs, et al., National SAMPE Symposium & Exhibition Proceedings, vol. 24, No. 2, pp. 1053–1068 (1979).

Serafini et al. NASA Technical Memorandum 82821 (May 4–6, 1982).

Serafini, NASA Technical Memorandum 83047 (Nov. 10–12, 1982).

Du Pont Brochure "Processing Guidelines for PI-2555 as Interlayer Dielectric" (Dated 4/85).

(List continued on next page.)

OTHER PUBLICATIONS

Du Pont Brochure "Preliminary Information Bulletin Spin Coating Techniques"—dated 5/85.
Du Pont Brochure "PI-2540", "PI-2545", "PI-2556", "PI-2560"—dated 5/85.
Du Pont Brochure on Procedure for Dispensing PYRALIN® PI-2560 & PI-2562—Dated 5/85.
Du Pont Brochure on "Semiconductor Grade Products"—dated 12/85.
Du Pont Brochure on "PI-2566"—dated 12/85.
Du Pont Brochure on "PYRALIN® SP PI-2570-D, SP PI-2575-D, LTP-PI-2590, PD-PI-2701-D''—dated 4/86.
Du Pont Brochure on "VM-651 Adhesion Promoter''—dated 4/86.
Du Pont Brochure on "PYRALIN® PD PI-2702-D''—dated 5/86.
Du Pont Brochure on "PI-2550, PI-2555"—dated 6/86.
Du Pont Brochure on "PYRALIN® PI-2556, PI-2562"—dated 6/86.
Du Pont Brochure on "Product Specification T-9039 Thinner"—dated 6/86.
Du Pont Brochure on "Test Methods for Product Specifications"—dated 6/86.
"THERMID® Polyimides", Brochure of National Starch and Chemical Corporation.
"Probimide TM" 200 Series Soluble Polyimides for Microelectronics" Brochure of Ciba-Geigy Corporation.
Brochure of Ciba-Geigy Corporation entitled "Microelectronic Chemicals".
Brochure entitled "NR-150 Polyimide Composites".
Brochure entitled Product Data-THERMID FA-700.
Delvigs, "371° C. Mechanical Properties of Graphite/Polyimide Composites" NASA Technical Memorandum 87122.
Alverz "600° F. Thermoplastic Polyimide Adhesive", National SAMPE Symposium.
Adhesive Age, Jan. 1979, pp. 35–39.
Gagliani, NAS9-14718, Final Report 7/1/75-12/31/75 "Fire Resistant Resilient Foams".
Gagliani, et al., NAS9-15050, Final Report, Jun. 1977, "Development of Fire-Resistant, Low Smoke Generating, Thermally Stable End Items for Aircraft & Spacecraft".
Gagliani, et al NAS-15484, "Development of Fire-Resistant, Low Smoke Generating Thermally Stable End Items for Commercial Aircraft & Spacecraft Using a Basic Polyimide Resin".
Galiani, et al NAS9-16009, "Formulation & Characterization of Polyimide Resilient Foams of Various Densities for Aircraft Seating Applications".

PROCESSING POLYIMIDE PRECURSOR COMPOSITIONS

TECHNICAL FIELD

This invention relates to transforming non-flowable resinous or viscous semi-solid polyimide precursors into flowable liquid form without at the same time causing significant chemical reaction to take place within the composition.

BACKGROUND

In my prior copending application Ser. No. 37,537, filed Apr. 13, 1987, polyimide precursor compositions are described which are eminently useful in psuedo hot-melt prepregging processes. These compositions are composed of a mixture of (a) about 40 to about 70 weight percent of a substantially equimolar mixture of (i) 2,2-bis[4-(4-aminophenoxy)phenyl]hexafluoropropane or 2,2-bis[4-(3-aminophenoxy)phenyl]hexafluoropropane, or both, and (ii) lower alkyl diester of at least one aromatic tetracarboxylic acid; (b) about 2 to about 50 weight percent of polyamide producible from components (i) and (ii); and (c) about 10 to about 50 weight percent of solvent. Such mixtures are clear resinous solids or semi-solids at 25° C. They have softening temperatures in the range of 30° to 40° C. At 60° C. they exist as viscous liquids having a viscosity in the range of 2,000 to 12,000 centistokes.

There are instances where it is desired to transform these or other non-flowable or essentially non-flowable polyimide precursor compositions into flowable liquids that can be readily poured from a container in which they are shipped or stored. While it is possible to add solvent to the compositions to render them free-flowing, this is undesirable as the compositions are usually employed for their intended purposes in the form of systems of high solids content. Another way of transforming the compositions into flowable liquids is to heat them to a suitable temperature at which their viscosity is decreased. However because of the reactivity of the mixture, it is necessary to keep the temperature relatively low, otherwise the mixture will undergo chemical transformations—viz., amidization and/or imidization.

Complicating the problem is the fact that heat transfer through these viscous compositions is poor. Thus, when dealing with, say, pound quantities or more, attempts to fluidize the material by heating in an oven even to relatively low temperatures (e.g., 60° C.) results in local overheating and consequent amidization and imidization. In the case of precursors for prepregging such chemical transformations can render the precursor unsuitable for use, as by forming prepregs with too little tack and drape.

The need for close control of the composition of prepreg precursors and the avoidance of undesired chemical transformations therein prior to prepreg formation is illustrated by the fact that such precursor compositions are normally kept in a frozen state to prevent the premature onset of amidization and worse yet, imidization. Moreover, the product and performance specifications imposed on such materials tolerate little premature change in composition.

The Invention

In accordance with this invention there is provided a process for transforming a normally non-flowable resinous semi-solid or viscous liquid polyimide precursor composition into a flowable liquid, said precursor composition comprising (a) a diester of an aromatic tetracarboxylic acid, (b) an aromatic diamine, (c) a polyamic acid producible from (i) an aromatic diamine and (ii) a dianhydride of an aromatic tetracarboxylic acid, and (d) an inert solvent in an amount insufficient to provide a flowable liquid at room temperature. This process comprises subjecting such precursor composition to microwave radiation of intensity sufficient to convert at least a portion of said composition into a flowable liquid without causing a significant change in the chemical composition of said precursor composition.

Preferably, the precursor composition is subjected to mixing (e.g., stirring or shaking) after it has been subjected to sufficient microwave radiation to render at least a portion of the precursor composition flowable. Likewise it is preferred to subject the precursor composition to conventional external thermal energy (e.g., heating in a thermal oven) after it has been subjected to sufficient microwave radiation to render at least a portion of the composition flowable. The amount of such external thermal energy used must be insufficient to cause a significant change in the chemical composition of the precursor composition.

Pursuant to another embodiment of this invention there is provided a microwave-compatible shipping or storage container containing a normally non-flowable resinous semi-solid or viscous liquid polyimide precursor composition transformable into a flowable liquid when exposed while in said container to microwave radiation of intensity sufficient to convert said composition into a flowable liquid without causing a significant change in chemical composition, said precursor composition comprising a diester of an aromatic tetracarboxylic acid, an aromatic diamine, and a polyamic acid producible from the dianhydride of said tetracarboxylic acid and said diamine.

Preferred compositions used in the above process and the above articles of this invention are those wherein the precursor composition comprises (a) a lower alkyl diester of pyromellitic acid, a lower alkyl diester of 3,3',4,4'-benzophenonetetracarboxylic acid, a lower alkyl diester of 2,2-bis(3,4-dicarboxyphenyl)hexafluoropropane, a lower alkyl diester of oxydiphthalic acid, or a lower alkyl diester of biphenyltetracarboxylic acid; (b) 2,2-bis[4-(4-aminophenoxy)phenyl]hexafluoropropane or 2,2-bis[4-(3-aminophenoxy)phenyl]hexafluoropropane, or both; (c) polyamic acid produced from (i) 2,2-bis[4-(4-aminophenoxy)phenyl]hexafluoropropane or 2,2-bis[4-(3-aminophenoxy)phenyl]hexafluoropropane, or both and (ii) pyromellitic acid dianhydride, 3,3',4,4'-benzophenonetetracarboxylic acid dianhydride, 2,2-bis(3,4-dicarboxylphenyl)hexafluoropropane dianhydride, oxydiphthalic acid dianhydride, or biphenyltetracarboxylic acid dianhydride; and (d) a suitable solvent which includes at least one dipolar aprotic solvent.

In these compositions a small amount of polyamic acid solubilizes 4-BDAF and lower dialkyl esters of aromatic tetracarboxylic acids to such an extent as to make possible the production of "high solids" solutions of mixtures of these polyimide precursors in appropriate solvents. Moreover, the resultant polyimide precursor systems are well-suited for use in the pseudo hot-melt process.

In particular, the preferred polyimide precursors used in this invention consist essentially of a mixture of (a) about 40 to about 70 percent by weight of a substantially equimolar mixture of (i) 2,2-bis[4-(4-aminophenoxy)phenyl]hexafluoropropane (4-BDAF) and/or 2,2-bis[4-(3-aminophenoxy)phenyl]hexafluoropropane (3-BDAF) and (ii) lower alkyl diester of one or more aromatic tetracarboxylic acids such as pyromellitic acid (PMA), 3,3',4,4'-benzophenonetetracarboxylic acid (BTA), 2,2-bis(3,4-dicarboxyphenyl)hexafluoropropane (FDA), oxydiphthalic acid, biphenyltetracarboxylic acid, or other aromatic tetracarboxylic acids (particularly those free or substantially free of aliphatic hydrocarbon substituents); (b) about 2 to about 50 percent by weight of polyamide producible from components (i) and (ii); and (c) about 10 to about 50 percent by weight of a solvent; with the proviso that said precursor is a clear resinous solid at 25° C., has a softening temperature in the range of 30° to 40° C., and at 60° C. is a viscous, tacky, varnish-like liquid having a viscosity in the range of 2,000 to 20,000 centistokes. Preferably the sum of (a) and (b) is at least 70 percent by weight with the remaining 30 percent by weight or less consisting essentially of the solvent, (c).

For best results, the solvent of these compositions should contain from 10 to 100 percent by weight of one or more dipolar aprotic solvents, preferably dimethylformamide, dimethylacetamide, N-methylpyrrolidone, diglyme, dimethylsulfoxide, or the like. Other solvents which may be used include ethers such as tetrahydrofuran, tetrahydropyran, etc.; chlorohydrocarbons such as methylene dichloride, etc.; ketones such as acetone, methyl ethyl ketone, etc.; alcohols such as methanol, ethanol, propanol, isopropanol, etc.; and the like.

Component (b), the polyamide, preferably corresponds in makeup to a polyamide that is producible from the particular components (i) and (ii) present in the aforesaid substantially equimolar mixture. However, it will be understood and appreciated that the polyamide component of the polyimide precursors may be producible from a set of components (i) and (ii) that differ from those actually present in the precursor mixture. For example, if component (i) is 4-BDAF and component (ii) is a diester of PMA, component (b) is preferably a 4-BDAF-PMA polyamic acid (polyamide) although component (b) may instead by a 4-BDAF BTA polyamic acid, a 3-BDAF-FDA polyamic acid, or the like. Moreover, the polyamide need not actually be prepared from 3-BDAF or 4-BDAF and the diester of an aromatic tetracarboxylic acid since, as is well known in the art, such polyamic acids are most readily produced by reaction between 4-BDAF or 3-BDAF and the dianhydride of a given aromatic tetracarboxylic acid.

Particularly preferred polyimide precursors have the following composition:

| | |
|---|---|
| (1) 4-BDAF and/or 3-BDAF | 25–50 wt % |
| (2) Diester of aromatic tetracarboxylic acid | 25–40 wt % |
| (3) Polyamide | 2–20 wt % |
| (4) Solvent | 15–25 wt % | provided of course that components (1) and (2) are present in substantially equimolar quantities, and the resultant precursor has the physical properties set forth above. In this connection, by "substantially equimolar quantities" is meant that the molar ratio of the components is in the range of 0.9 up to 1.1 and preferably in the range of 1.0 up to 1.1.

It will be appreciated of course that the polyamide component will generally be of relative low molecular weight, e.g., its weight average molecular weight will often fall in the range of about 1500 to 5000.

In one embodiment of this invention a paper web is coated with a polyimide precursor which has been fluidized using the microwaving process of this invention. Such coated paper is readily prepared by applying to a web of release paper a flowable coating of a polyimide precursor fluidized by means of this invention whereby very little polyimide formation occurs, and then cooling the coating to produce a coating that remains solid at room temperature. In this operation, the coating is preferably applied to only one side of the paper web and for this purpose roll coaters or other standard coating apparatus may be used.

The coated paper is in turn used in the production of prepreg tape or the like. In this operation, a continuous fibrous substrate (e.g., carbon fibers, glass fibers, etc. whether aligned unidirectionally or woven) is impregnated with a polyimide precursor of the type described hereinabove. Most preferably, this is accomplished by passing a web of sized release paper one side of which is coated with the polyimide precursor and the fibrous substrate through a bank of hot rolls so that the heat-softened coating comes in contact with the fibrous substrate and is transferred thereto and impregnated thereon. Thereupon, the impregnated substrate is cooled so that the polyimide precursor is solidified. In this operation, as in the operation in which the coated release paper itself is produced, the temperature of the heating is controlled so that polyimide formation is kept to a minimum. Preferably a web of uncoated sized release paper is passed through the bank of hot rolls on the opposite side of the substrate to prevent the transferred coating from adhering to the rolls on that side of the substrate. After the coating has solidified on the substrate, this web of release paper is separated from the impregnated substrate and discarded.

To prepare the polyimide precursors several different procedures may be used. A particularly desirable procedure, especially when conducting the process on the laboratory scale, is to form an essentially equimolar mixture of (a) 4-BDAF (2,2-bis[4-(4-aminophenoxy)-phenyl]hexafluoropropane) and/or and 3-BDAF (2,2-bis[4-(3-aminophenoxy)phenyl]hexafluoropropane) and (b) lower alkyl diester of an aromatic tetracarboxylic acid such as PMA, BTA, FDA, etc., or any mixture of lower alkyl diesters of two or more tetracarboxylic acids in an excess quantity of the solvent, preferably a solvent containing at least 10% by weight of a dipolar aprotic solvent, and subject the mixture to vacuum stripping using a rotary evaporator at 70° to 100° C. and a few mm of pressure. On a larger scale it may be possible to use a wiped wall evaporator under these temperatures and reduced pressure conditions. Another procedure is to preform the polyamide by reaction at low temperature (e.g., zero to 90° C.) between equimolar amounts of (a) 4-BDAF and/or 3-BDAF and (b) an aromatic dianhydride such as pyromellitic acid dianhydride, 3,3',4,4'-benzophenonetetracarboxylic acid dianhydride, 2,2-bis(3,4-dicarboxyphenyl)hexafluoropropane dianhydride, oxydiphthalic acid dianhydride, biphenyltetracarboxylic acid dianhydride, or any mixture of such materials. Thereupon, suitable quantities of this polyamide (also known as polyamic acid or polyamic ester) are blended with the other components in the requisite quantities to form the precursor. In any such procedure care should be taken to avoid exposure of the reactants to excessive heat as this could result in premature polyimide formation, which is undesirable. Another particularly convenient procedure is to form the polyamide in situ by forming a mixture of (a) 4-BDAF and/or 3-BDAF, (b) diester-diacid of PMA, BTA, and/or FDA, or other aromatic tetracarboxylic acid (or mixture of such materials), and (c) solvent, which mixture contains from about 2 to 20 molar excess 4-BDAF and/or 3-BDAF relative to the diesterdiacid(s) present and to this adding an amount of an aromatic anhydride substantially equivalent to the amount of excess 4-BDAF and/or 3-BDAF present. This anhydride reacts with the excess quantity of 4-BDAF and/or 3-BDAF to form polyamide in situ and leaves the substantially equimolar quantities of the 4-BDAF and/or 3-BDAF and diester-diacid unreacted.

As noted above, the precursor, however prepared, should possess the requisite physical properties, viz., it should be a clear resinous solid at 25° C., it should have a softening temperature in the range of 30° to 40° C., and at 60° C. it should be a viscous liquid having a viscosity in the range of 2,000 to 20,000 centistokes.

The diesters used in the precursor formulations may be represented by the general formula

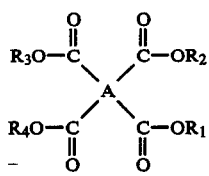

wherein A is a tetravalent aromatic group and $R_1$ to $R_4$ are hydrogen or lower alkyl with two of them (usually one of $R_1$ and $R_2$ and one of $R_3$ and $R_4$) being hydrogen and the other two being lower alkyl. The tetravalent aromatic group (A) is preferably one having one of the following structures:

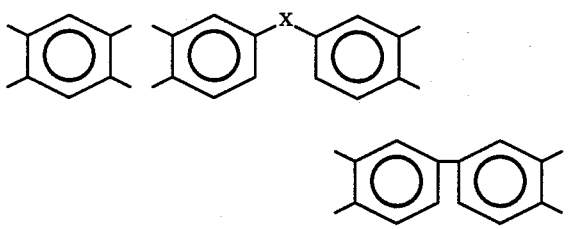

wherein X is one or more of the following:

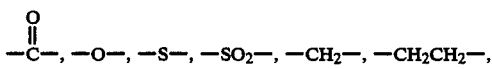

The following diesters are preferably used in the precursor formulations:
dimethyl ester of 1,2,4,5-benzenetetracarboxylic acid, (also known as dimethyl ester of pyromellitic acid)
diethyl ester of 1,2,4,5-benzenetetracarboxylic acid
diisopropyl ester of 1,2,4,5-benzenetetracarboxylic acid
methyl ethyl ester of 1,2,4,5-benzenetetracarboxylic acid
methyl isopropyl ester of 1,2,4,5-benzenetetracarboxylic acid
dimethyl ester of 3,3',4,4'-benzophenonetetracarboxylic acid
diethyl ester of 3,3',4,4'-benzophenonetetracarboxylic acid
diisopropyl ester of 3,3',4,4'-benzophenonetetracarboxylic acid
methyl ethyl ester of 3,3',4,4'-benzophenonetetracarboxylic acid
methyl isopropyl ester of 3,3',4,4'-benzophenonetetracarboxylic acid
dimethyl ester of 2,2-bis(3,4-dicarboxyphenyl)hexafluoropropane
diethyl ester of 2,2-bis(3,4-dicarboxyphenyl)hexafluoropropane
diisopropyl ester of 2,2-bis(3,4-dicarboxyphenyl)hexafluoropropane
methyl ethyl ester of 2,2-bis(3,4-dicarboxyphenyl)hexafluoropropane
methyl isopropyl ester of 2,2-bis(3,4-dicarboxyphenyl)hexafluoropropane
dimethyl ester of oxydiphthalic acid
diethyl ester of oxydiphthalic acid
diisopropyl ester of oxydiphthalic acid
dimethyl ester of biphenyl-3,3',4,4'-tetracarboxylic acid
diethyl ester of biphenyl-3,3',4,4'-tetracarboxylic acid
diisopropyl ester of biphenyl-3,3',4,4'-tetracarboxylic acid
Other diesters which may be used include:
dipropyl ester of 1,2,4,5-benzenetetracarboxylic acid
di-tert-butyl ester of 1,2,4,5-benzenetetracarboxylic acid
di-sec-butyl ester of 1,2,4,5-benzenetetracarboxylic acid
methyl propyl ester of 1,2,4,5-benzenetetracarboxylic acid
methyl tert-butyl ester of 1,2,4,5-benzenetetracarboxylic acid
dipropyl ester of 3,3',4,4'-benzophenonetetracarboxylic acid
di-tert-butyl ester of 3,3',4,4'-benzophenonetetracarboxylic acid
di-sec-butyl ester of 3,3',4,4'-benzophenonetetracarboxylic acid
methyl propyl ester of 3,3',4,4'-benzophenonetetracarboxylic acid
methyl sec-butyl ester of 3,3',4,4-benzophenonetetracarboxylic acid
dipropyl ester of 2,2-bis(3,4-dicarboxyphenyl)hexafluoropropane
di-tert-butyl ester of 2,2-bis(3,4-dicarboxyphenyl)hexafluoropropane
di-sec-butyl ester of 2,2-bis(3,4-dicarboxyphenyl)hexafluoropropane
dipropyl ester of oxydiphthalic acid
di-sec-butyl ester of biphenyl-3,3',4,4'-tetracarboxylic acid The following examples illustrate the production of various precursors using the vacuum stripping procedure. The general procedure used was as follows: Pyromellitic dianhydride (PMDA) or benzophenonetetracarboxylic dianhydride (BTDA) is heated for 2 to 3 hours with a low boiling alcohol (e.g., ethyl alcohol, EtOH) in a dipolar aprotic solvent such as N-methyl pyrrolidone (NMP), dimethylformamide (DMF), or dimethylacetamide (DMAc) at 60°-90° C. until reaction is complete (1 to 3 hours). Two moles of alcohol react per mole of anhydride and a solution containing an equimolar mixture of two isomeric diesters forms. Small amounts of monoester triacid and sometimes small amounts of monoester monoanhydride are present as byproducts. An equimolar quantity of 2,2-bis[4-(4-aminophenoxy)phenyl]hexafluoropropane (4-BDAF) is dissolved in the diester solution to give a dark clear amber liquid containing about 60% non-volatile solids (NVS).

This free flowing liquid (typically 100-600 cst at 25° C.) is then heated on a rotary evaporator under vacuum at 70° to 95° C. for about 2 hours to remove solvent and increase the NVS to about 80 weight percent. The product is a very viscous liquid at 60° to 80° C. that sets to a dark clear resinous solid at room temperature. In addition to monomers (diester+4-BDAF) it contains small quantities of low molecular weight polyamic esters and acids.

Experimental conditions and results are summarized in the ensuing Table.

TABLE I
PREPARATION OF PREPREGGING SOLUTIONS

| | Example No. | | | | |
|---|---|---|---|---|---|
| | 1 | 2 | 3 | 4 | 5 |
| A. DIESTER PREPARATION | | | | | |
| *Anhydride* | | | | | |
| Type | PMDA | PMDA | PMDA | PMDA | PMDA |
| g | 218 | 218 | 240 | 240 | 262 |
| Mole | 1.0 | 1.0 | 1.10 | 1.10 | 1.20 |
| *Alcohol* | | | | | |
| Type | EtOH | IPA | IPA | EtOH | MeOH |
| g | 93 | 120 | 132 | 102 | 79 |
| Mole | 2.02 | 2.0 | 2.2 | 2.21 | 2.64 |
| *Solvent* | | | | | |
| Wt. & Type | 550 g NMP | 550 g NMP | 600 g DMF | 600 g DMF | 600 g DMF |
| *Conditions* | | | | | |
| Temp °C. | 60-70 | 60 | 60 | 60-65 | 65 |
| Time Hr | 2.5 | 2.0 | 2.5 | 2 | 5 |
| B. DIESTER 4-BDAF | | | | | |
| Mole Diester | 0.98 | 0.99 | 1.09 | 0.77 | 1.19 |
| Mole 4-BDAF | 0.98 | 0.99 | 1.09 | 0.77 | 1.19 |
| Solvent | 278 g NMP | 0 | 0 | 0 | 350 |
| Solids wt % | 50 | 61 | 60 | 60 | 50 |
| C. STRIP | | | | | |
| Temp °C. | 70-90 | 75-95 | 80-90 | 75-80 | 80-95 |
| Time Hr | 3 | 2.5 | 2 | 2 | 3 |
| Press mm Hg | 15 | 10 | 2 | | |
| Water Mole | 0.33 | 0.32 | 0.33 | 0.14 | 0.42 |
| Alcohol Mole | 0.10 | 0.14 | 0 | 0.03 | .25 |
| *Amidization Route* | | | | | |
| Via COOH % | 11 | 10 | 9 | 3 | 15 |
| Via COOR % | 5 | 7 | 0 | 2 | 15 |
| % Solids wt % | 79 | 81 | 83 | 82 | 74 |

| | Example No. | | | | |
|---|---|---|---|---|---|
| | 6 | 7 | 8 | 9 | 10 |
| A. DIESTER PREPARATION | | | | | |
| *Anhydride* | | | | | |
| Type | PMDA | BTDA | BTDA | BTDA | PMDA |
| g | 218 | 322 | 322 | 322 | 218 |
| Mole | 1.0 | 1.0 | 1.0 | 1.0 | 1.0 |
| *Alcohol* | | | | | |
| Type | EtOH | EtOH | IPA | MeOH | EtOH |
| g | 93 | 101 | 132 | 70 | 101 |
| Mole | 2.02 | 2.2 | 2.2 | 2.2 | 2.2 |
| *Solvent* | | | | | |
| Wt. & Type | 550 g DMAc | 600 g NMP | 600 g NMP | 600 g NMP | 500 g NMP |
| *Conditions* | | | | | |
| Temp °C. | 60-70 | 60-75 | 70-84 | 60-75 | 65-70 |
| Time Hr | 2.4 | 5 | 4.5 | 2 | 2 |
| B. DIESTER 4-BDAF | | | | | |
| Mole Diester | 0.98 | 0.99 | 0.99 | 0.99 | 0.99 |
| Mole 4-BDAF | 0.98 | 0.99 | 0.99 | 0.99 | 0.99 |
| Solvent | 0 | 227 | 0 | 0 | 0 |
| Solids wt % | 60 | 50 | 66 | 60 | 61 |
| C. STRIP | | | | | |
| Temp °C. | 70-95 | 80-95 | 80-95 | 80-95 | 90-95 |
| Time Hr | 3 | 2.8 | 2 | 2 | 2.5 |
| Press mm Hg | 2-10 | 1-5 | 1-5 | 2-5 | 2-5 |
| Water Mole | — | 0.58 | 0.66 | 0.76 | 0.28 |
| Alcohol Mole | — | 0.00 | 0.05 | 0.13 | 0.35 |

TABLE I-continued
PREPARATION OF PREPREGGING SOLUTIONS

| Amidization Route | | | | | |
|---|---|---|---|---|---|
| Via COOH % | — | 30 | 28 | 36 | 17 |
| Via COOR % | — | 0 | 3 | 7 | 25 |
| % Solids wt % | 83 | 73 | 84 | 77 | 84 |

Each of the freshly prepared precursors of Examples 1-10 was found to have the requisite physical properties for use in preparing prepregs. In particular, fiberglass cloth was impregnated with the freshly prepared respective precursors at 60° to 80° C. and the impregnated cloth was found to have the necessary tack and drape for prepregging.

EXAMPLE 11

Preparation of Polyimide Precursor Solution and Prepreg

A two liter round bottomed flask was fitted with mechanical stirrer, reflux condenser, nitrogen inlet and thermometer. Two hundred fifty grams (250 g) of NMP were charged to the flask followed by 218 g (1.0 mole) of PMDA. To the thick slurry that formed, 64 g (2.0 moles) of dry methyl alcohol (0.03% $H_2O$) were added. A vigorous reaction set in driving the temperature of the reaction mass from 29° C. to 77° C. (momentarily to 83° C.). A clear straw-colored liquid resulted which was heated at about 70° C. for 7 hours. NMR analysis showed that the mixture had the following composition:
52 wt % PMDE (2 isomeric diesters)
1 wt % PMME (monoester triacid)
47 wt % NMP On cooling to 25° C., the product solidified and 50 g more of NMP were added and the mixture warmed to 60° to 65° when it again became liquid. Five hundred fifteen grams (515 g) (0.99 mole) of 4-BDAF were gradually stirred into the PMDE solution to give a very viscous amber solution.

To 550 g of the latter were added 51.8 g (0.1 mole) 4-BDAF and 21.8 g (0.10 mole) PMDA. The mixture was stirred at about 60° C. for 2½ hours to yield a very viscous amber solution which set to a tacky, resinous semi-solid on cooling. Gel permeation chromatography, NMR and infra red spectroscopy showed that this polyimide precursor solution contained a substantial amount of polyamic acid in addition to the PMDE and 4-BDAF monomers.

The usefulness of the precursor solution in hot-melt processing was demonstrated as follows:

Several ounces of the molten precursor solution were spread into a film on strips of release paper at about 60° to 70° C. On cooling the resinous film remained supple and the coated paper could be bent sharply without breaking the coating. Consequently, it could be easily stored in this form by rolling the coated paper into conveniently sized rolls as is the practice in pseudo hot-melt processing.

A piece of woven carbon fiber cloth was placed on top of a piece of the coated paper and then covered with another piece of release paper. The sandwich-like product was warmed to 60° to 70° C. on a hot plate and pressure applied to help the melted coating to flow for a few seconds. On cooling, the paper was peeled from the now fully impregnated carbon fiber cloth. Virtually all of the coating had been transferred from the paper to the cloth—another requirement in the hot melt process.

The resulting carbon fiber prepreg had good tack and drape and was stored on paper backing. Storage tests at 0° C. and 25° C. showed that the prepreg had retained its tack and drape for two weeks with little or no change in its chemical composition. This demonstrates that the prepreg compositions have adequate stability for handling under normal operating conditions. However, when a portion of the prepreg was kept at 50°-60° C. overnight, it hardened and lost its tack—emphasizing the need for proper storage of the product. Normally the product is stored in a freezer.

EXAMPLE 12

Using the same apparatus and procedure as in Example 11, another precursor solution and prepreg composition were prepared to demonstrate that small variations in the diamine/diester molar ratio are allowable without any adverse effect on prepreg properties.

Four hundred thirty-six grams (436 g) (2.0 moles) PMDA were added to 600 g NMP with stirring to form a thick slurry. One hundred thirty-two grams (132 g) (4.1 moles) of dry methyl alcohol were added over 20 minutes to yield a clear solution. The addition caused a strong exotherm that drove the temperature of the reaction mass from 34° C. to 72° C. After stirring at about 65° C. for 1 hour, analysis of the reaction mass indicated that the solution contained about 39% of a mixture of equal amounts of two isomeric diester diacids of PMDA.

To 233 g (0.4 mole) of this PMDE solution were added 197 g (0.38 mole) of 4-BDAF. The molar ratio of PMDE:4-BDAF was 1.05:1. After stirring for 2½ hours at 50°-65° C., a viscous amber solution resulted. Analysis showed that in addition to the PMDE and 4-BDAF, a small but significant amount of polyamide had formed during the heating period. In this case no further addition of polyamide was made.

A prepreg was made by the procedure described in the Example 11. Although it was somewhat tackier than the prepreg of Example 11, it possessed the same desirable properties.

EXAMPLE 13

A 500 mL round bottom flask fitted with mechanical stirrer, thermometer, nitrogen inlet and reflux condenser was charged with the following components:
a) 109.0 g (0.20 mole) of a 51 weight percent solution of the dimethyl ester of PMDA in N-methyl pyrrolidone (NMP)
b) 198 g (0.19 mole) of a 50 weight percent solution of 4-BDAF in tetrahydrofuran (THF).

The resulting clear solution was refluxed (72° C. to 78° C.) for 3.5 hours and analyses were made periodically which showed that polyamide formed progressively during this reflux period.

Most of the THF was removed from the product by distillation at a pot temperature of about 64° C. and increasing vacuum to a final pressure of about 5 mm Hg.

The resultant clear, viscous solution (that still contained a few percent of residual THF), set to a resinous semi-solid on cooling to room temperature.

It readily impregnated carbon fiber cloth to give a prepreg with good tack and drape.

Figure 2:
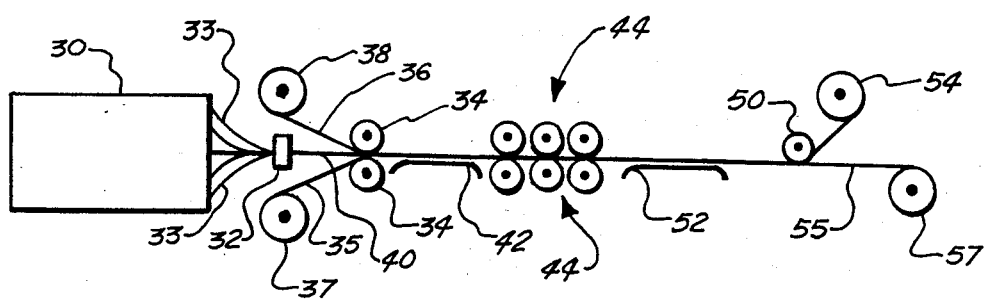

In the Drawing:

FIG. 1 illustrates a method for applying a coating of polyimide precursor to a paper web; and FIG. 2 illustrates a method for impregnating a continuous fibrous substrate with polyimide precursor.

Referring to FIG. 1, a typical paper coater system that may be used in preparing coated papers comprises paper feed roll 10, coated paper takeup roll 12, and tensioning rolls 14,14 and cold platen 16 over which the paper web is passed. Positioned above the tensioned paper web is a heated coating transfer roll 18 which receives the coating resin (i.e., a polyimide precursor of this invention) from hopper 20. Roll 18 keeps the resin in a molten condition and the molten coating adhering thereto is transferred to the paper web, the thickness of the coating being regulated by knife 22 which keeps a puddle of molten resin on the upper portion of roll 18 between knife 22 and fence 24. Thus by controlling the rate of resin feed from hopper 20 to roll 18, the rate at which the paper web is transferred from roll 10 to roll 12, the temperature of roll 18 and the gap between knife 22 and roll 18, a smooth even coating of the molten resin is applied to the paper web. As the coated web passes over platen 16 the coating is solidified. Since the coating is flexible and non-tacky after such cooling, the coated paper web is readily taken up on roll 12. In the system depicted, roll 18 is rotated countercurrently to the movement of the paper web, and this is the preferred arrangement. However, it is possible to rotate roll 18 in the opposite direction provided the positions of knife 22 and fence 24 are reversed. Platen 16 may utilize cooling water and provide any suitable cooling temperature, such as for example, 7 to 10° C. Hopper 20 may contain heating means to premelt the resin before it is transferred to roll 18.

In the system of FIG. 2, a plurality of fibers 33 are drawn from creel 30 and through comb 32 which closely aligns them in parallel. In a typical installation creel 30 may contain, say, 100 to 500 bobbins of fiber. The resultant fibrous substrate 40 is passed between rolls 34,34 between a paper web 35 coated with a polyimide precursor (from supply roll 37) and an uncoated paper web 36 (from supply roll 38). The coating is of course on the side of web 35 confronting substrate 40. The sandwich structure leaving rolls 34,34 is passed over heater 42 and thence between a bank of hot rolls 44 whereby the substrate 40 is impregnated with resinous coating from web 35. The sandwich structure is then passed over platen 52 to cause the softened resinous polyimide precursor to solidify. Thereupon, web 36 is drawn off by roll 50 and spool 54. The cooled paper-backed prepreg 55 is taken up on spool 57.

In the form shown in FIG. 2, the apparatus is adapted for use in production of a unidirectional prepreg. It will of course be appreciated that a woven fibrous substrate may be used as a substrate 40 in lieu of aligned fibers. It will also be appreciated that the webs 35 and 36 may be reversed so that the coated web is above and the uncoated web is below substrate 40, again with the coating confronting the substrate. It is also possible to use two rolls of coated paper web, one above and one below substrate 40. In all cases, the paper web should be sized with a suitable releasing agent so that it can be readily separated from the adjacent fibrous substrate.

It will be understood and appreciated that other systems may be used for producing the coated paper webs and prepregs, the arrangements given in FIGS. 1 and 2 being merely typical systems that may be employed for these purposes.

The practice and advantages of this invention will become still further apparent from the following additional illustrative examples. The general procedure used in synthesizing the precursor compositions involved producing the diester component in a suitable dipolar aprotic solvent, heating of this product with a solution of 2,2-bis[4-(4-aminophenoxy)phenyl]hexafluoropropane (4-BDAF) relatively volatile solvent (tetrahydrofuran, THF) and then stripping off tetrahydrofuran from the product at reduced pressure. In Example 12 a product having one mole of pyromellitic acid dimethyl ester per mole of 4-BDAF was formed. In Example 2 these components were present in a molar ratio of 1.05:1.0 respectively.

EXAMPLE 12

Preparation of Pyromellitic Acid Dimethyl Ester

A 12-liter flask was fitted with mechanical stirrer, reflux condenser, dropping funnel, thermometer and nitrogen inlet N-methylpyrrolidone (3900 g) and pyromellitic acid dianhydride (3270 g; 15.0 moles) were stirred together to form a slurry and 1008 g methanol (99.9% pure; 0.03% $H_2O$) were added over a period of 67 minutes. The temperature rose from 48° C. to 74° C. due to the exothermic reaction. The system was subsequently allowed to cool to about 55° C.

Preparation of 4-BDAF Solution

To 16-liter reactors were added, 10.038 kg of a 50% solution of 4-BDAF in pure dry THF (>99.5% pure; 0.05% $H_2O$) and 5185 g of pyromellitic acid dimethyl ester solution in N-methylopyrrolidone as prepared above. This mixture was heated from 36° to 70° C. over 85 minutes but no pressure developed (reactor seal leaking) and the stirrer was not working. The reactor contents were cooled and discharged as an opaque, tan colored viscous liquid into a 12-liter round bottom flask and kept under $N_2$ at 40° C. while reactor repairs were made (about 1 week). The 16-liter reactor was recharged with reaction mass which was then heated to 80° C. for 4½ hours. After cooling overnight, the THF was removed by vacuum distillation at 50°-60° C. over a 4 hour period. 9274 g (20.4 lb) of product was recovered together with 5525 g of THF. The product was collected in HDPE (high density polyethylene) 1 quart jars. Screening tests indicated that this material had the necessary physical properties to produce prepregs with good tack and drape. The jars were kept in a freezer to inhibit reaction in the product.

EXAMPLE 13

3227 g of the pyromellitic acid dimethyl ester solution (6.0 moles) and 5920 g of the 50% 4-BDAF solution (5.71 moles) were heated together in a 16-liter reactor at 80° C. for five hours. After overnight cooling, THF was recovered at 50°-60° C. and at pressures down to about 1 mm Hg over 3 hours. 5621 g of product was collected in 1 quart HDPE jars. These were placed in a freezer for storage.

In order to liquefy the products formed in Examples 12 and 13 the procedure described in Example 14 was followed.

EXAMPLE 14

The 1 quart HDPE containers and their contents from Examples 12 and 13 were removed from the freezer and allowed to stand for 16 hours at room temperature. Each loosely capped container of the resin precursor was placed on the revolving table in the center of a commercially available microwave oven (Sears Model #566.8878611). The container was then irradiated with microwaves at 10% power for 9 minutes. The containers were then removed from the oven and the hot (60°–65° C.) liquid centers were mixed with the relatively cool (50°–55° C.) outer portions of the contents using a spatula. Then, the cap was replaced loosely and the containers placed in a 65°–70° C. convection oven for 15–20 minutes while occasionally stirring the contents of the containers. The liquid product was then readily poured from the containers into another vessel. Samples of the precursors subjected to this fluidization procedure were subjected to NMR and IR analyses in order to compare their compositions both before and after the fluidization procedure. The results of these analyses are summarized in the following table:

|  | Product of Example 12 | | Product of Example 13 | |
| --- | --- | --- | --- | --- |
|  | Before Melting | After Melting | Before Melting | After Melting |
| Wt % Composition (by NMR): | | | | |
| NMP calc | 24 | 24 | 25 | 25 |
| found | 26 | 25 | 24 | 24 |
| 4-BDAF free | 39 | 37 | 38 | 38 |
| bound | 12 | 15 | 14 | 15 |
| PMDE | 20 | 18 | 19 | 18 |
| PMME | 3 | 4 | 5 | 4 |
| MeOH | <1 | <1 | <1 | <1 |
| Imide | trace | trace | trace | trace |

Abbreviations:
NMP = N—methylpyrrolidone
4-BDAF = 2,2-bis[4-(4-aminophenoxy)phenyl]hexafluoropropane
PMDE = pyromellitic acid dimethyl ester
PMME = pyromellitic acid monomethyl ester
MeOH = methanol It will be seen from the results in the above table that the practice of this invention resulted in virtually no change in composition in the polyimide precursor compositions.

The following procedure is recommended for use when applying the process of this invention to ten pound (4.5 kg) HDPE pails of precursors when preparing the material for use in the manufacture of coated paper for use in making prepreg tapes or the like:

EQUIPMENT 2 ea Microwave Ovens: Sears Model No. 564.8796280, 564.8796381 1600 w/2450 MHz
2 ea "Micro-Go-Round-Plus" Turntables
1–2 Heavy Spatulas or Smoothing trowel for stirring
1 ea Thermocouple and Probes

Procedure (1) Remove resin from freezer 24 hours in advance of use to allow to come to ambient temperature. Alternatively, heat material in microwave on defrost cycle for 5 minutes.

(2) Remove lids from pails. Remove metal bales, if present. Wind Micro-go-round. Set Microwave ovens as described below to 200° C. convection and 15 minutes time:

A. Touch Clear
B. Touch OVEN TEMP/PREHEAT
C. Touch 2-0-0
D. Touch MICRO/CONVEC TIME
E. TOUCH 1-5-0-0

(3) Place open pail of resin in the Microwave on the Micro-go-round in the center of the oven. Press "Start".

(3A) When Timer of first Microwave has reached 9 minutes (6 minutes of heating has elapsed) place a second pail of resin in the second Microwave and press "Start".

(4) When the Timer has counted down to 3 minutes (12 minutes of heating has elapsed), remove pail from the oven and stir with spatula, using a technique that redistributes any lumps of resin throught the mass of resin.

(5) While stirring, insert thermocouple in resin and allow to come to equilibrium. Read temperature (which should be approximately 160° F.).

NOTE: If temperature is not approximately 160° F. at this point, plant to adjust total cycle accordingly. The temperature is expected to rise 5 to 7. per minute and therefore should achieve the desired final temperature of 175° to 180° F. at the end of the 15 minute cycle (if at 160° F. when 12 minutes has elapsed).

(6) Replace pail of resin in Microwave and press "Start".

(7) When microwave shuts off (15 minutes has elapsed), remove pail from oven, stir with spatula and read temperature with thermocouple. Temperature should be between 175° and 180° F.

(8) Supply heated resin to coating line or store up to 15 minutes in a preheated (180° F.) oven until ready for use.

(9) When second Microwave reaches 3 minutes (12 minutes of heating has elapsed) remove pail from oven for stirring and proceed as in (5) forward, above.

A typical schedule for programming the utilization of the two Microwaves is shown on the following table.

| TYPICAL MICROWAVE SCHEDULE | | | | |
| --- | --- | --- | --- | --- |
| TIME ELAPSED | MICROWAVE 1 Operation | READ —min. | MICROWAVE 2 Operation | READ —min. |
| 0 | Start | 15 | — | — |
| 6 | — | 9 | Start | 15 |
| 12 | Stir | 3 | — | 9 |
| 13 | Restart | 3 | — | 8 |
| 16 | Discharge | 0 | — | 5 |
| 17 | Start | 15 | — | 4 |
| 18 | — | 14 | Stir | 3 |
| 19 | — | 13 | Restart | 3 |
| 22 | — | 10 | Discharge | 0 |
| 23 | — | 9 | Start | 15 |
| 29 | Stir | 3 | — | 9 |
| 30 | Restart | 3 | — | 8 |
| 33 | Discharge | 0 | Start | 5 |
| 34 | Start | 15 | — | 4 |
| 35 | — | 14 | Stir | 3 |
| 36 | — | 13 | Restart | 3 |
| 39 | — | 10 | Discharge | 0 |
| 40 | — | 9 | Start | 15 |
| 46 | Stir | 3 | — | 9 |
| 47 | Restart | 3 | — | 8 |
| 50 | Discharge | 0 | — | 5 |
| 51 | Start | 15 | — | 4 |
| 52 | — | 14 | Stir | 3 |
| 53 | — | 13 | Restart | 3 |
| 56 | — | 10 | Discharge | 0 |

-continued

TYPICAL MICROWAVE SCHEDULE

| TIME ELAPSED | MICROWAVE 1 Operation | READ —min. | MICROWAVE 2 Operation | READ —min. |
|---|---|---|---|---|
| 57 | — | 9 | Start | 15 |
| 63 | Stir | 3 | — | 9 |
| 64 | Restart | 3 | — | 8 |
| 67 | Discharge | 0 | — | 5 |
| 69 | — | — | Stir | 3 |
| 70 | — | — | Restart | 3 |
| 73 | — | — | Discharge | 0 |

While this invention has been discussed primarily with reference to 2-2-bis[4-(4-aminophenoxy)phenyl]-hexafluoropropane and 2-2-bis[4-(3-aminophenoxy)-phenyl]hexafluoropropane (or combinations thereof) as the aromatic diamine component of the polyimide precursor compositions, any of a variety of other aromatic or heterocyclic diamines may be used, either alone or in various combinations. Typical amines of this type include 4,4'-methylenebisaniline, 2,6-diaminopyridine, 4,4'-diaminodiphenyl sulfone, 4,4'-diaminodiphenyl ether, and the like.

This invention is susceptible to considerable variation in its practice within the spirit and scope of the appended claims.

What is claimed is:

1. A flowable liquid polyimide precursor composition having a solids content of at least 70% by weight and comprising (a) 25-40 wt % of a diester of an aromatic tetracarboxylic acid (b) 25-50 wt % of 2,2-bis[4-(4-aminophenoxy)-phenyl]hexafluoropropane or 2,2-bis[4-(3-aminophenoxy)phenyl]-hexafluoropropane, (c) 2-20 wt % of a polyamic acid having a weight average molecular weight of about 1500 to about 5000 produced from (a) and (b), and (d) 15-25 wt % of an inert solvent produced by the process comprising:
   (1) forming a composition that is viscous liquid at 60° to 80° C. and a non-flowable semi-solid or viscous liquid when cooled by
      (i) combining substantially equimolar quantities of component (a) and component (b) in component (d);
      (ii) heating the combination of step i) to about 70° to 95° for a time sufficient to react some of component (a) with some of component (b) to form component (c);
      (iii) cooling the composition from step (ii) thereby forming said non-flowable semi-solid or liquid polyimide precursor.
   (2) Subjecting the polyimide precursor composition of step 1) to microwave radiation of intensity and for a time sufficient to form said flowable liquid polyimide precursor composition but not cause a significant change in the chemical composition of said non-flowable semi-solid or liquid precursor composition.

2. A microwave-compatible shipping or storage container containing a normally non-flowable resinous semi-solid or viscous liquid polyimide precursor composition transformable into a flowable liquid when exposed while in said container to microwave radiation of intensity sufficient to convert said composition into a flowable liquid without causing a significant change in chemical composition, said precursor composition having a solids content of at least 70% by weight and comprising (a) a lower alkyl diester of pyromellitic acid, a lower alkyl diester of 3,3',4,4'-benzophenonetetracarboxylic acid, a lower alkyl diester of 2,2-bis(3,4-dicarboxyphenyl)hexafluoropropane, a lower alkyl diester of oxydiphthalic acid, or a lower alkyl diester of biphenyltetracarboxylic acid; (b) 2,2-bis[4-(4-aminophenoxy)-phenyl]hexafluoropropane, or both; (c) a polyamic acid having a weight average molecular weight of about 1500 to about 5000 and produced from (i) 2,2-bis[4-(4-aminophenoxy)phenyl]hexafluoropropane, 2,2-bis[4-(3-aminophenoxy) phenyl]hexafluoropropane or both and (ii) pyromellitic acid dianhydride, oxydiphthalic acid dianhydride, or biphenyltetracarboxylic acid dianhydride; and (d) at least one dipolar aprotic solvent produced by the process comprising:
   1) forming a composition that is a viscous liquid at 60° to 80° C. and a non-flowable semi-solid or viscous liquid when cooled by
      i) combining substantially equimolar quantities of component (a) and component (b) in component (d);
      ii) heating the combination of step i) to about 70° to 95° for a time sufficient to react some of component (a) with some of component (b) to form component (c);
      iii) cooling the composition from step ii) thereby forming said non-flowable semi-solid of liquid polyimide precursor.

3. A product of claim 1 wherein said diester is a lower alkyl diester of an aromatic tetracarboxylic acid.

4. A product of claim 1 wherein said solvent includes at least one dipolar aprotic solvent.

5. A product of claim 1 wherein said diester is a lower alkyl diester of pyromellitic acid, a lower alkyl diester of 3,3',4,4'-benzophenonetetracarboxylic acid, a lower alkyl diester of 2,2-bis(3,4-dicarboxyphenyl)hexafluoropropane, a lower alkyl diester of oxydiphthalic acid, or a lower alkyl diester of biphenyltetracarboxylic acid.

6. A product of claim 5 wherein said solvent includes N-methylpyrrolidone.

7. A product of claim 1 further characterized by subjecting said composition to said radiation while said composition is contained within a microwave-compatible shipping or storage container therefor.

8. A product of claim 7 wherein said composition comprises a lower, alkyl diester of pyromellitic acid, a lower alkyl diester of 3,3',4,4'-benzophenonetetracarboxylic acid, a lower alkyl diester of 2,2-bis(3,4-dicarboxyphenyl)hexafluoropropane, a lower alkyl diester of oxydiphthalic acid, or a lower alkyl diester of biphenyltetracarboxylic acid; said polyamic acid is produced from (i) 2,2-bis hexafluoropropane or 2,2-bis[4-(4-aminophenoxy)phenyl]hexafluoropropane, or both and (ii) pyromellitic acid dianhydride, 3,3',4,4'-benzophenonetetracarboxylic acid dianhydride, 2,2-bis(3,4-dicarboxyphenyl)hexafluoropropane dianhydride, oxydiphthalic acid dianhydride, or biphenyltetracarboxylic acid dianhydride; and said solvent includes at least one dipolar aprotic solvent.

9. A product of claim 8 wherein said solvent includes N-methylpyrrolidone.

10. A product of claim 8 wherein said precursor composition comprises a lower alkyl diester of pyromellitic acid, 2,2-bis[4-(4-aminophenoxy)phenyl]hexafluoropropane, and polyamic acid produced from (i) 2,2-bis hexafluoropropane and (ii) pyromellitic acid.

11. A product of claim 10 wherein the solvent of said precursor composition includes N-methylpyrrolidone.

12. A product of claim 8 wherein said precursor composition comprises a lower alkyl diester of 3,3′,4,4′-benzophenonetetracarboxylic acid, 2,2-bis[4-(4-aminophenoxy)phenyl]hexafluoropropane, and polyamic acid produced from (i) 2,2-bis[4-(4-aminophenoxyl)phenyl]-hexafluoropropane and (ii) 3,3′,4,4′-benzophenonetetracarboxylic acid dianhydride.

13. A product of claim 12 wherein the solvent of said precursor composition includes N-methylpyrrolidone.

14. A product of claim 1 further comprising mixing said precursor composition after it has been subjected to sufficient microwave radiation to render at least a portion of the precursor composition flowable.

15. A product of claim 1 further comprising applying external radiant thermal energy to said precursor composition after it has been subjected to sufficient microwave radiation to render at least a portion of the composition flowable, the amount of the external radiant thermal energy being insufficient to cause a significant change in the chemical composition of said precursor composition.

16. An article of claim 2, wherein said solvent includes N-methylpyrolidone.

17. An article of claim 2 wherein said precursor composition comprises a lower alkyl diester of pyromellitic acid, 2,2-bis hexafluoropropane, and polyamic acid produced from (i) 2,2-bis hexafluoropropane and (ii) pyromellitic acid.

18. A article of claim 2 wherein the solvent of said precursor composition includes N-methylpyrrolidone.

19. An article of claim 2 wherein said precursor composition comprises a lower alkyl diester of 3,3′,4,4′-benzophenonetetracarboxylic acid, 2,2-bis hexafluoropropane, and polyamic acid produced from (i) 2,2-bis hexafluoropropane and (ii) 3,3′,4,4′-benzophenonetetracarboxylic acid dianhydride.

20. An article of claim 19 wherein the solvent of said precursor composition includes N-methylpyrrolidone.

* * * * *

UNITED STATES PATENT AND TRADEMARK OFFICE
CERTIFICATE OF CORRECTION

PATENT NO. : 4,892,896

DATED : January 9, 1990

INVENTOR(S) : William E. Wright

It is certified that error appears in the above-identified patent and that said Letters Patent is hereby corrected as shown below:

Column 16, line 26, reads "semi-solid of" and should read -- semi-solid or --

Column 16, line 51 reads "2,2-bis hexafluoropropane" and should read -- 2,2-bis[4-(4-aminophenoxy)phenyl]hexafluoropropane --

Column 16, line 51 reads "2,2-bis[4-(4-" and should read -- 2,2-bis[4-(3- --

Column 16, line 65 reads "2,2-bis hexa-" and should read -- 2,2-bis[4-(4-aminophenoxy)phenyl] -- (compare Claim 13, page 30, line 4).

Column 18, line 7 reads "2,2-bis" and should read -- 2,2-bis[4-(4-aminophenoxy)phenyl] --

Column 18, line 8 reads "2,2-bis" and should read -- 2,2-bis[4-(4-aminophenoxy)phenyl] --

Column 18, line 14 reads "2,2-bis" and should read -- 2,2-bis[4-(4-aminophenoxy)phenyl] --

UNITED STATES PATENT AND TRADEMARK OFFICE
CERTIFICATE OF CORRECTION

PATENT NO. : 4,892,896

DATED : January 9, 1990

INVENTOR(S) : William E. Wright

It is certified that error appears in the above-identified patent and that said Letters Patent is hereby corrected as shown below:

Column 18, line 15 reads "2,2-bis" and should read -- 2,2-bis[4-(4-aminophenoxy)phenyl] --

Signed and Sealed this

Twenty-fifth Day of February, 1992

Attest:

HARRY F. MANBECK, JR.

*Attesting Officer*  Commissioner of Patents and Trademarks